United States Patent [19]

DuVall

[11] 4,357,566
[45] Nov. 2, 1982

[54] TRANSDUCER SYSTEM WITH VELOCITY SIGNAL GENERATION

[75] Inventor: Wilbur E. DuVall, Victorville, Calif.

[73] Assignee: Xerox Corporation, Stamford, Conn.

[21] Appl. No.: 187,266

[22] Filed: Sep. 15, 1980

[51] Int. Cl.³ .............................................. G05B 21/02
[52] U.S. Cl. ..................................... 318/636; 318/654; 318/661; 340/347 SY
[58] Field of Search ............... 318/616, 608, 636, 654, 318/656–661; 340/347 SY

[56] References Cited

U.S. PATENT DOCUMENTS 3,761,811  9/1973  Aberle et al. ...................... 318/654
3,839,665  10/1974  Gabor ................................. 318/616

Primary Examiner—B. Dobeck
Attorney, Agent, or Firm—Leonard Zalman

[57] ABSTRACT

To generate a signal having at all times an amplitude directly proportional to the velocity of relatively moving members, a plurality of phase displaced position indicative signals are first generated. A pair of the position signals that are phase displaced by 90° are then differentiated to provide velocity signals. Each velocity signal is applied in both its regular form and its inverted form to an analog multiplexer which receives the other position signals as control signals. The composite output of the multiplexer, after filtering to remove high frequency glitches due to sampling, is a signal having an amplitude at all times directly proportional to velocity.

1 Claim, 4 Drawing Figures

TRANSDUCER SYSTEM WITH VELOCITY SIGNAL GENERATION

BACKGROUND OF THE INVENTION

It is necessary in many systems to bring a moveable member to a stop at a precise location. For example, in a magnetic memory disk device bearing a number of information and servo tracks, it is required that the read/write head be positioned over a particular track. Likewise, in a high speed printer with intermittent print wheel movement, it is required that the print wheel be rotated so that a particular character is in the print position.

Closed loop servo system, such as the system described in U.S. Pat. No. 3,663,880, utilize a signal indicative of the instantaneous velocity of the motor shaft supporting the member to be positioned. Accordingly, it is important that the velocity signal used for such positioning have an amplitude at all times directly proportional to the velocity of the supporting motor shaft.

SUMMARY OF THE INVENTION

In accordance with the invention, a plurality of phase displaced position indicative signals are generated. A pair of the position signals that are phase displaced by 90° are differentiated to provide velocity signals. Each velocity signal is applied in both its regular form and its inverted form to an analog multiplexer which receives the other position signals as control signals. The composite output of the multiplexer, after filtering to remove high frequency glitches due to sampling, is a signal having an amplitude at all times directly proportional to velocity.

DETAILED DESCRIPTION OF THE DRAWINGS

FIG. 1 ia a schematic/block diagram of a tracking circuit in accordance with the invention.

DETAILED DESCRIPTION OF THE INVENTION

Figure 1:
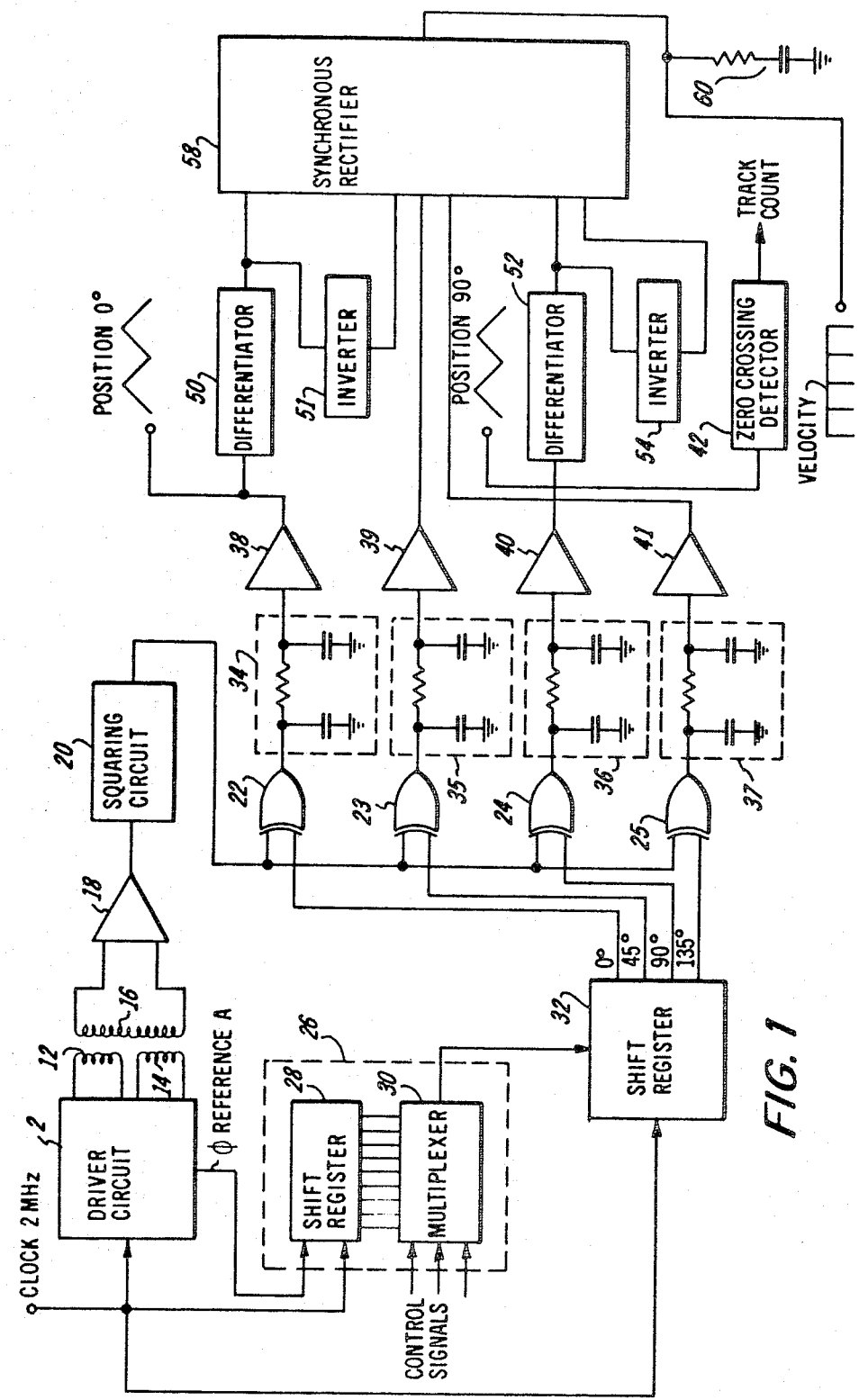
Figure 2:
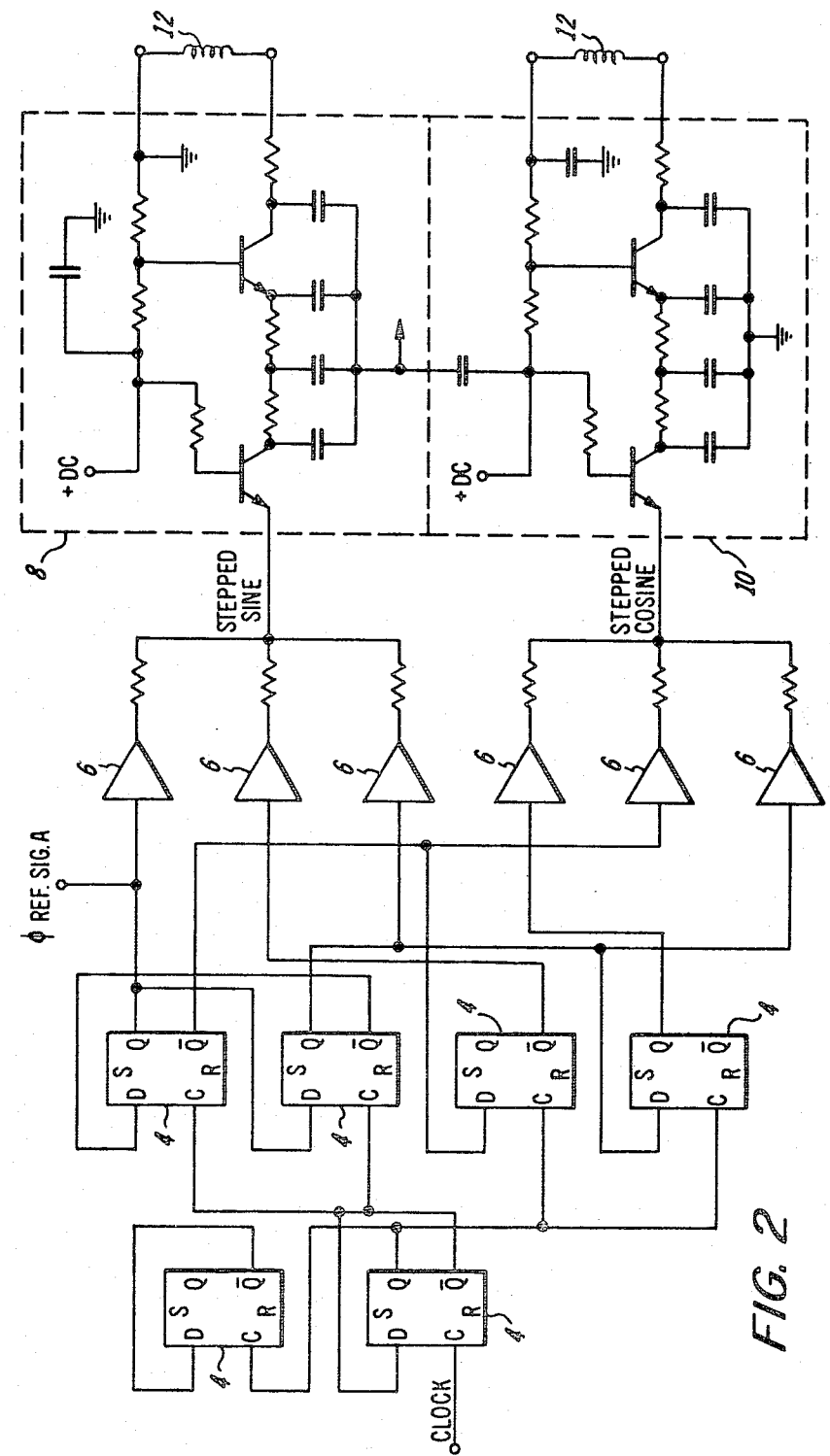
FIG. 2 is a schematic diagram of a component of the tracking circuit of FIG. 1.

Referring now to FIG. 1, a driver circuit 2 receives as an input a 2 MHz clock signal from a conventional clock generator (not shown) and produces at a first output a sine wave signal of 250 KHz, at a second output a cosine wave signal of 250 KHz and of a current amplitude equal to that of the sine wave, and at a third output a square wave signal of 250 KHz designated as phase reference signal A. As shown in FIG. 2, driver circuit 2 can be of the Walsh function type including a plurality of flip flops 4, a plurality of open collector buffer inverters 6 whose outputs are current summed to produce stepped versions of the sine and cosine waves, and first and second filter circuits 8 and 10 to remove the sharp edges or high frequency components of the stepped sine and cosine waves, respectively. Driver circuits of other configurations can be used as long as they produce sine and cosine waves that are phase locked and of equal current amplitude as the circuit to be described uses current drive because of inductance and resistance of the transducer conductors are not tightly controlled during manufacture. The sine and cosine waves are applied to stator windings 12 and 14, respectively. Due to its motion relative to the stator windings, the rotor winding 16 generates a 250 KHz sine wave signal having a phase determined by the magnitude of that relative motion. The rotor winding signal, after being filtered to remove noise, is amplified by amplifier 18 and then supplied to a squaring circuit 20 of conventional design. Squaring circuit 20 is a high speed comparator which produces a square wave signal having a phase and frequency corresponding to that of the rotor signal. A square wave signal is needed since the phase detectors 22, 23, 24 and 25 used in this preferred embodiment are of the conventional exclusive OR type which operate most effectively with square wave inputs having sharp edges with minimum jitter.

Figure 3:
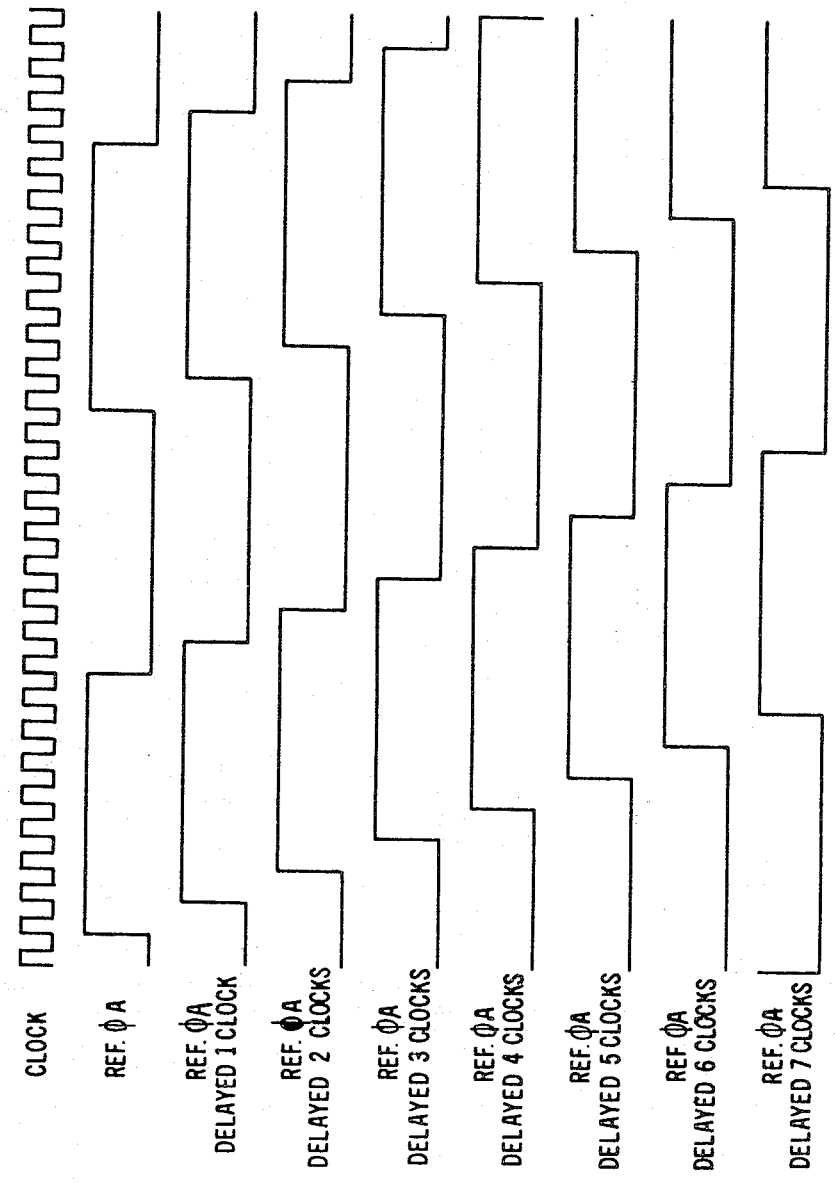
FIG. 3 depicts phase delayed signals generated by the circuit of FIG. 1.

The phase reference signal A is supplied to an 8 stage digital phase shifter circuit 26 which is comprised of an 8 stage shift register 28 and a conventional 8 to 1 multiplexer 30. One input of phase shifter 28 receives phase reference signal A and another input receives the clock signal, while the 8 outputs of the shift register 28 are connected in parallel to the 8 inputs of multiplexer 30. One input to multiplexer 30 is the phase reference signal A and the other inputs are the phase reference signal A delayed progressively by 1 to 7 clock pulses, as shown by the waveforms of FIG. 3. Control signals shown as three bit parallel port are accessed from a microprocessor, for example, or other appropriate logic, and applied to the control terminals of multiplexer 30. An algorithm run by the microprocessor is used to determine which one of the 8 phase reference signals of FIG. 3 corresponds to a desired track position to be accessed, and accordingly determines the multiplexer control signals for accessing that phase reference signal from the multiplexer. With 8 phases, every 8th track will have the same phase reference. With the track number exposed in binary, the three least significant bits of the track number is the phase number, and those bits are applied to the control signal ports of multiplexer 30.

The accessed output of multiplexer 30, which, as noted, can be any one of the waveforms shown in FIG. 3, for example, the waveform delayed 4 clock pulses, is supplied to a shift register 32 which produces a first output corresponding to its input with no phase shift, a second output shifted 45° relative to the input signal, a third output shifted 90° relative to the input signal, and a fourth output shifted 135° relative to the input signal. Each of the four outputs of shift register 32 is supplied to one of the phase detectors 22, 23, 23, 25 which, as previously noted, also receive the output of squaring circuit 20. The outputs of the phase detectors are high frequency rectangular pulses that are duty cycle or width modulated, that is, the outputs have an amplitude at the logic level, a width or period indicative of the phase relationship between its inputs, and a duty cycle equal to or determined by the carrier frequency. Those outputs have several frequency components, one of which is the low frequency component, on the order of a few thousand cycles per second at high rotor velocity, which is the desired position signal and other unwanted high frequency carrier frequency components that are filtered out by filters 34, 35, 36, 37. Buffers 38, 39, 40, 41, receive the outputs of filters 34, 35, 36, 37, respectively, the buffering being needed in order to drive a low load impedance through the filters. Thus, the low frequency output signals of the buffers are triangular shaped position signals at relative phases of 0°, 45°, 90° and 135°, with the position signals having a frequency which is a function of the phase relationship between the inputs to the phase detectors.

Counting of the transitions of any one of the four reference phased position signals will provide the desire track count for the servo system. Peak detection of the zero phase signal can provide that count, however, peak detectors are gain or amplitude sensitive and may not provide an accurate count. A more accurate track count is provided by detecting the zero or reference amplitude crossing points of the 90° position signal since, with all the position signals being centered about the same reference amplitude, the reference amplitude crossing points of the 90° position signal will correspond to the peaks of the 0° position signal. Accordingly, the 90° position signal is supplied to a conventional zero crossing detector 42, the output of which is a train of pulses occurring at twice the track count. Accordingly, a simple division by two of the peak detector 42 output signal will provide the track count which is a greater track count by the number of the stages of the digital phase shifter 26, thus the transducer has increased resolution.

Figure 4:
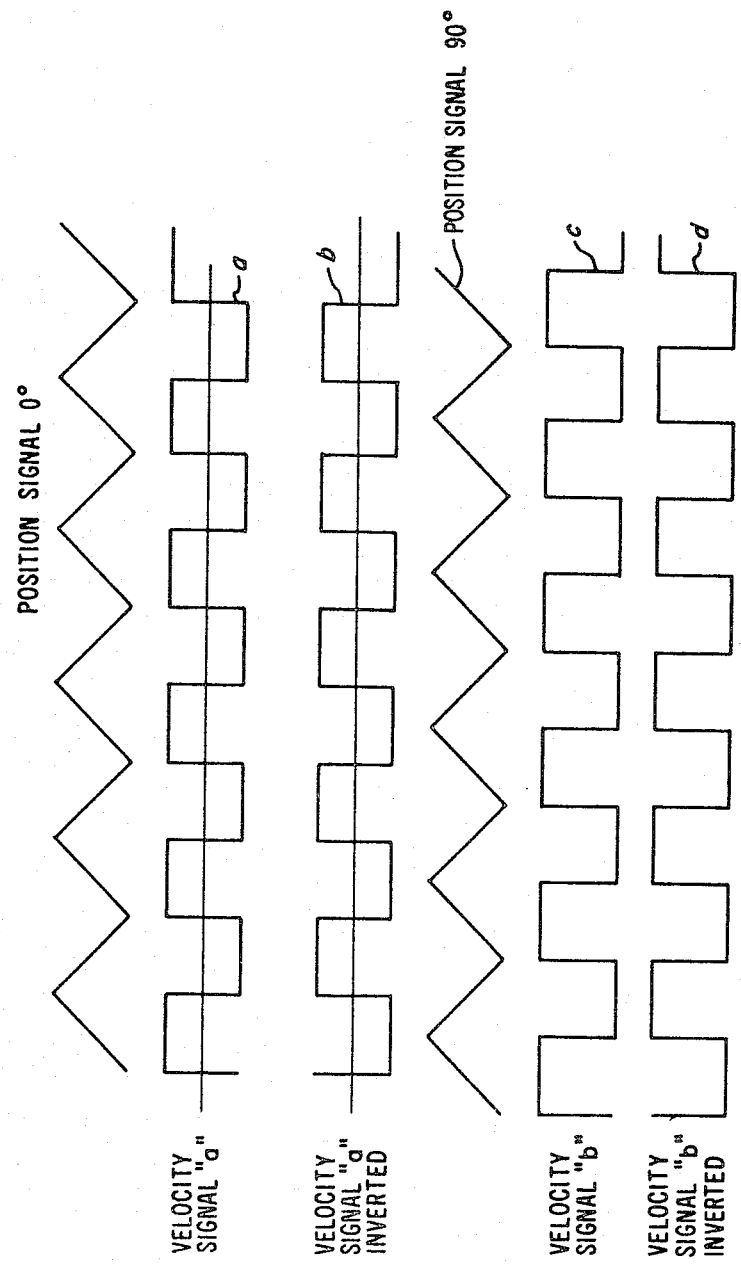
FIG. 4 depicts velocity signals generated by the circuit of FIG. 1.

The four phases of the position signal; i.e., 0°, 45°, 90° and 135°, are used to provide a signal having an amplitude at all times directly proportional to the velocity of the rotor. That is achieved by generating a first velocity signal from the 0° position signal, a signal which is an inversion of the first velocity signal, a second velocity signal from the 90° position signal and an inversion of the second velocity signal. Accordingly, the output of buffer 38 is supplied to a differentiator circuit 50 to produce a velocity signal "a" and that velocity signal "a" is supplied to an inverter 51 to produce a velocity signal "b" which is velocity signal "a" inverted. Likewise, the output of buffer 40 is supplied to a differentiator circuit 52 to produce a velocity signal "c" and that velocity signal "c" is supplied to an inverter 54 to produce a velocity signal "d" which is velocity signal "c" inverted. As is well known, the rate of change of the position signal is indicative of velocity and accordingly, as shown in FIG. 4, the velocity signals "a" and "c" being derived from triangular shaped position signals will have a substantially square wave shape with a frequency equal to the frequency of the position signals and an amplitude corresponding to the rate of change of the amplitude of the position signals. As also shown in FIG. 4, the velocity signals "b" and "d" are respectively velocity signals "a" and "c" inverted.

As noted, the velocity signals are only substantially square wave shaped since they are derived from position signals that have somewhat round peaks due to the bandwidth limited nature of the circuit. More exactly, the velocity signals will be somewhat trapezoidal and to get a velocity signal having an amplitude at all times directly proportional to the velocity of the rotor, the flat plateau portions of the velocity signals "a", "b", "c", and "d" must be sequentially sampled.

Returning to FIG. 1, the four velocity signals "a", "b", "c" and "d" are supplied as four inputs to a synchronous rectifier 58, that is, an analog multiplexer. Supplied also to synchronous rectifier 58 are the 45° and 135° position signals. The 45° and 135° position signals act as sampling controls and determine when each plateau portion of each of the four velocity signals "a", "b", "c" and "d" is to be sampled. Specifically, when the 45° and 135° position signals are both of high amplitude (a 11 logic level) position signal "a" is sampled, when the 45° position signal is of high amplitude and the 135° position signal is of low amplitude (a 10 logic level) position signal "b" is sampled, when the 45° position signal is low amplitude and the 135° position signal is of high amplitude (a 01 logic level) position signal "c" is sampled, and when the 45° and 135° position signals are both of low amplitude (a 00 logic level) position signal "d" is sampled. Thus, the composite output signal of the synchronous rectifier, after filtering by filter 60 to remove high frequency glitches due to sampling, is a signal having an amplitude at all times directly proportional to the velocity of the rotor, that is, there is no rotor velocity error. The polarity of the velocity signal provides an indication of the direction of rotation of the rotor.

The system described could find application in many different types of control systems. For example, it could be used to locate a track of an information storage disk of the magnetic, optical or other type, or locate a print wheel or carriage at the proper printing position. In addition, it is equally applicable to rotary and linear transducers.

I claim:

1. A system for locating a device at a desired position by providing a signal indicative of the velocity of one member of the relatively moveable members of a transducer coupled to said device, comprising:

first means for generating a clock signal;

second means connected to receive said clock signal for generating both a first signal having a phase determined by the relative motion of said relatively moveable members and a phase reference signal;

third means connected to receive said clock signal and said phase reference signal for providing a plurality of signals each phase delayed relative to the other of said plurality of signals by one or more clock signal increments;

fourth means connected to receive said plurality of signals and control signals for outputting one of said plurality of signals, said one of said plurality of signals having a phase corresponding to said desired position;

fifth means connected to receive said clock signal and said one of said plurality of signals for providing a second plurality of signals each phase displaced relative to the other of said second plurality of signals;

phase detector means connected to receive said first signal and said second plurality of signals for providing a plurality of phase displaced position signals;

differentiator means adapted to receive some of said plurality of position signals for generating a plurality of signals indicative of the velocity of said member;

inverter means adapted to receive said velocity signals for producing amplitude inverted forms of said velocity signals; and sampling means adapted to receive said velocity signals and said inverted velocity signals as inputs to be sampled and the undifferentiated position signals as sampling controls for sequentially sampling the amplitudes of said velocity signals to provide a composite output signal at all times directly proportional to the velocity of said member.

* * * * *